(12) United States Patent
Sherman et al.

(10) Patent No.: US 9,394,466 B2
(45) Date of Patent: Jul. 19, 2016

(54) METHOD OF MAKING ADHESIVE ARTICLE

(75) Inventors: Audrey A. Sherman, St. Paul, MN (US); Jayshree Seth, Woodbury, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 332 days.

(21) Appl. No.: 12/988,415

(22) PCT Filed: Apr. 9, 2009

(86) PCT No.: PCT/US2009/040004
§ 371 (c)(1),
(2), (4) Date: Oct. 18, 2010

(87) PCT Pub. No.: WO2009/131839
PCT Pub. Date: Oct. 29, 2009

(65) Prior Publication Data
US 2011/0064916 A1     Mar. 17, 2011

Related U.S. Application Data

(60) Provisional application No. 61/046,813, filed on Apr. 22, 2008.

(51) Int. Cl.
*C09J 7/02*     (2006.01)
(52) U.S. Cl.
CPC ............ *C09J 7/0207* (2013.01); *C09J 2201/28* (2013.01); *Y10T 156/10* (2015.01); *Y10T 428/24612* (2015.01)
(58) Field of Classification Search
None
See application file for complete search history.

(56) References Cited

U.S. PATENT DOCUMENTS

| 2,736,721 | A | 2/1956 | Dexter |
| 4,554,324 | A | 11/1985 | Husman et al. |
| 4,737,559 | A | 4/1988 | Kellen et al. |
| 5,151,309 | A | 9/1992 | Dollinger |
| 5,154,974 | A | 10/1992 | Norman et al. |
| 5,214,119 | A | 5/1993 | Leir et al. |
| 5,296,277 | A | 3/1994 | Wilson |
| 5,506,279 | A | 4/1996 | Babu et al. |
| 5,580,640 | A | 12/1996 | Kraft et al. |
| 5,591,290 | A | 1/1997 | Walter et al. |
| 5,650,215 | A | 7/1997 | Mazurek et al. |
| 5,663,228 | A | 9/1997 | Sasaki et al. |

(Continued)

FOREIGN PATENT DOCUMENTS

EP     0 377 289         7/1990
EP     1 493 790 A1     1/2005

(Continued)

OTHER PUBLICATIONS

PCT International Search Report for PCT/US2009/040004 mailed Dec. 4, 2009.

*Primary Examiner* — Barbara J Musser
(74) *Attorney, Agent, or Firm* — Jeffrey M. Olofson (57) ABSTRACT

Methods of making cut adhesive articles are described. The methods involve: providing a crosslinked pressure sensitive adhesive layer disposed on a substrate, embossing a surface of the crosslinked pressure sensitive adhesive layer to form a microstructured crosslinked pressure sensitive adhesive layer having a microstructured adhesive surface, and die cutting the microstructured crosslinked pressure sensitive adhesive layer.

12 Claims, 2 Drawing Sheets

(56) References Cited

U.S. PATENT DOCUMENTS

| | | |
|---|---|---|
| 5,985,075 A | 11/1999 | Freedman |
| 6,083,856 A | 7/2000 | Joseph et al. |
| 6,123,890 A | 9/2000 | Mazurek et al. |
| 6,197,397 B1 | 3/2001 | Sher et al. |
| 6,210,524 B1 | 4/2001 | Josephy |
| 6,511,725 B1 | 1/2003 | Rawlings |
| 6,630,218 B1 | 10/2003 | Abe |
| 6,686,014 B1 | 2/2004 | Washburn et al. |
| 6,706,356 B2 | 3/2004 | Lee |
| 6,794,441 B2 | 9/2004 | Hansen |
| 6,838,150 B2 | 1/2005 | Mazurek et al. |
| 6,841,257 B2 | 1/2005 | Sasaki et al. |
| 7,175,898 B2 | 2/2007 | Luhmann et al. |
| 7,288,590 B2 | 10/2007 | Lechat et al. |
| 7,727,351 B2 | 6/2010 | Keite-Telgenbuscher et al. |
| 7,897,226 B2 | 3/2011 | Suzuki |
| 2001/0051264 A1 | 12/2001 | Mazurek |
| 2002/0007014 A1 | 1/2002 | Hyde |
| 2003/0180531 A1 | 9/2003 | Husemann et al. |
| 2004/0007322 A1 | 1/2004 | Lechat et al. |
| 2006/0225838 A1 | 10/2006 | Sher |
| 2006/0228510 A1* | 10/2006 | Sher et al. .................. 428/40.1 |
| 2007/0148475 A1 | 6/2007 | Sherman et al. |
| 2007/0212535 A1 | 9/2007 | Sherman et al. |
| 2008/0017303 A1* | 1/2008 | Crouch ........................ 156/249 |
| 2009/0111055 A1 | 4/2009 | Mazurek et al. |

FOREIGN PATENT DOCUMENTS

| | | | |
|---|---|---|---|
| GB | 2438379 A | * | 11/2007 |
| JP | 2003-292917 A | | 10/2003 |
| WO | WO 96/24644 A1 | | 8/1996 |
| WO | WO 99/35201 A1 | | 7/1999 |
| WO | WO 99/42536 A1 | | 8/1999 |
| WO | WO 00/69985 | | 11/2000 |
| WO | WO 2007/138279 | | 12/2007 |

* cited by examiner

METHOD OF MAKING ADHESIVE ARTICLE

CROSS-REFERENCE TO RELATED APPLICATIONS

This application is a national stage filing under 35 U.S.C. 371 of PCT/US 2009/040004, filed Apr. 9, 2009, which claims priority to U.S. Provisional Application No. 61/046,813, filed Apr. 22, 2008, and the disclosure of which is incorporated by reference in its entirety herein.

FIELD

This disclosure relates to methods for making adhesive articles, particularly pressure sensitive adhesive articles, and to methods of using the articles to make laminate constructions.

BACKGROUND

Almost every kind of pressure sensitive adhesive (PSA) article in use today is cut in some way, e.g., during manufacturing as the article is being made, or when the article is being adapted by a customer for some specific use. Applications in which PSA articles may be used continue to grow, as does the need for cutting the articles into more custom and complicated shapes.

PSA materials and articles can be difficult to cut. Past approaches have relied on balancing the properties of a given PSA such that it is soft enough to adhere in a desired function/application, yet is able to resist any flow that would lead to undesired effects when die cut. Some of the undesired effects of such flow include sticky residue left on both the cutting blade and the cut edges of the PSA article. Also, if the PSA is viscoelastic, it can dampen out some of the energy used to cut the PSA, and energy can be lost into the PSA itself. For PSA articles having a backing, an approach for improving die cutting performance of PSA materials is to increase the stiffness of the backing. Other approaches impose limitations on the PSAs (chemically and rheologically) to satisfy the needs of the die cutting process.

Dispensing labels includes the steps of separation of the labels from a liner, and the application of each label to a substrate surface. Typically, the label can be separated from the liner by bending the liner back over a peel-plate such that the peel-plate causes separation of the label from the liner. If the label is stiff enough, it will continue on a straight path toward the desired substrate surface overcoming the release force between the label adhesive and the release liner. The stiffness needed for dispensability can limit the choice of materials that can be used as well as the overall design of the label.

SUMMARY

Briefly, in one aspect, the present disclosure provides a method of making a cut adhesive article, the method comprising: providing an adhesive article having a crosslinked pressure sensitive adhesive layer disposed on a substrate, embossing a surface of the crosslinked pressure sensitive adhesive layer to form a microstructured crosslinked pressure sensitive adhesive layer having a microstructured adhesive surface, and die cutting the microstructured crosslinked pressure sensitive adhesive layer. In some embodiments, embossing comprises contacting the surface of the crosslinked pressure sensitive adhesive layer with a microstructured release liner. In some embodiments, embossing comprises contacting the surface of the crosslinked pressure sensitive adhesive layer with a microstructured molding tool.

In another aspect, the present disclosure provides a method of making a cut adhesive article, the method comprising: providing an adhesive article comprising a crosslinked pressure sensitive adhesive layer disposed between two release liners; removing one of the two release liners to expose a surface of the crosslinked pressure sensitive adhesive layer; embossing the surface of the crosslinked pressure sensitive adhesive layer to form a microstructured crosslinked pressure sensitive adhesive layer having a microstructured surface, wherein embossing comprises contacting the surface of the crosslinked pressure sensitive adhesive layer with a microstructured release liner; and die cutting the microstructured crosslinked pressure sensitive adhesive layer.

In another aspect, the present disclosure provides a method of making a cut adhesive article, the method comprising: providing an adhesive article comprising a crosslinked pressure sensitive adhesive layer disposed on a release liner; contacting the crosslinked pressure sensitive adhesive layer with a substrate; removing the release liner to expose a surface of the crosslinked pressure sensitive adhesive layer; embossing the surface of the crosslinked pressure sensitive adhesive layer to form a microstructured crosslinked pressure sensitive adhesive layer having a microstructured surface, wherein embossing comprises contacting the surface of the crosslinked pressure sensitive adhesive layer with a microstructured release liner; and die cutting the microstructured crosslinked pressure sensitive adhesive layer.

In another aspect, the present disclosure provides a method of dispensing an adhesive article, comprising: providing a microstructured adhesive article prepared by: providing a crosslinked pressure sensitive adhesive layer disposed on a backing, and embossing a surface of the crosslinked pressure sensitive adhesive layer to form a microstructured crosslinked pressure sensitive adhesive layer having a microstructured adhesive surface, wherein embossing comprises contacting a surface of the crosslinked pressure sensitive adhesive layer with a microstructured release liner; and bending the microstructured adhesive article such that the microstructured crosslinked pressure sensitive adhesive layer self-releases from the microstructured liner.

These and other aspects of the invention are described in the detailed description below. In no event should the above summary be construed as a limitation on the claimed subject matter which is defined solely by the claims as set forth herein.

BRIEF DESCRIPTION OF THE DRAWINGS

The invention may be more completely understood in consideration of the following detailed description in connection with the following figures.

DETAILED DESCRIPTION

Generally, there are two broad categories of PSA articles. PSA articles in the first category typically comprise a free adhesive film supported by at least one release liner. In some embodiments, e.g., for adhesive transfer tapes, a second release liner may be present on the opposite side of the adhesive film. In some embodiments, a support layer (e.g., a film, cloth or scrim) may be embedded in the adhesive film. For example, in some embodiments, a support layer may be coated on both sides with the same or different adhesives. PSA articles in the second category typically comprise a substrate permanently bonded to one surface of an adhesive film and a release liner temporarily adhered to the second surface of the adhesive. In some embodiments, PSA articles in the second category include tapes and labels.

Regardless of the form they take, PSA articles are frequently converted. Exemplary converting operations include slitting (e.g., razor slitting) to obtain articles of a desired width, cross-cutting (e.g., guillotining) to obtain articles of a desired length, and die cutting (e.g., flatbed and rotary) to obtain articles of a desired shape. Other converting operations include, e.g., perforating and punching.

In some converting operations, all layers of an adhesive article are cut. In other operations, e.g., die cutting, the cutting (or crushing) edge of the die penetrates through one or more adjacent layers while other layers are not penetrated. This mode is often referred to as controlled depth die-cutting or kiss-cutting. This method is frequently used to convert label stocks where the cutting action cuts the permanently bonded substrate (typically referred to as the face stock) and the adhesive layer but does not cut the release liner.

During a converting operation, the adhesive layer is separated along the cut line, e.g., along the path of the razor during slitting, or around the perimeter of the die during die cutting. PSA articles can be difficult to convert because PSAs have viscoelastic properties that can limit the ease and quality of a cut. For example, die cutting involves relatively low deformation rates wherein the adhesive is pushed to the side of the cut. As the elasticity of the PSA increases, there is a greater tendency for the adhesive to recover from this deformation and flow back toward the cut line, which can result in undesirable adhesive "oozing."

Previous attempts to control adhesive ooze have focused on altering the chemistry of the adhesive itself. However, such an approach may require an adhesive formulator to balance the properties of the adhesive to give both low ooze and adequate adhesion for the intended purpose. Unfortunately, the same viscoelastic properties of an adhesive that tend to result in undesirable ooze during cutting, may be necessary to provide adequate bonding to a given substrate.

Microstructured adhesive articles have been prepared by applying a flowable pressure sensitive adhesive to the surface of a microstructured release liner or the surface of a microstructured molding tool. The process results in the creation of an adhesive having a microstructured surface. When the resulting articles are dry laminated under pressure to substrates such as glass or polymer films, the microstructural features created in the adhesive surface allow air to escape from the bonding interface, thereby minimizing or preventing the formation of bubbles and pinholes. During lamination, the microstructural features flatten out and wet the substrate surface under the influence of applied pressure. In the process, however, stresses are introduced into the adhesive as the adhesive relaxes and tries to return to its initial microstructured state. These stresses can create defects in the adhesive that adversely affect its optical properties.

Disclosed herein is a method of making a cut adhesive article having a layer of a PSA disposed on least one surface of a substrate. The cut adhesive article may be prepared by: providing an adhesive article having a crosslinked PSA layer disposed on a substrate, embossing a surface of the crosslinked PSA layer to form a microstructured crosslinked PSA layer having a microstructured adhesive surface, and die cutting the microstructured crosslinked PSA layer.

PSAs are well known to those of ordinary skill in the art to possess properties including (1) aggressive and permanent tack, (2) adherence with no more than finger pressure, (3) sufficient ability to hold onto an adhered, and (4) sufficient cohesive strength. Materials that have been found to function well as PSAs include polymers designed and formulated to exhibit the requisite viscoelastic properties resulting in a desired balance of tack, peel adhesion, and shear holding power.

Suitable crosslinked PSAs include crosslinked (meth) acrylics, rubbers, thermoplastic elastomers, silicones, and the like. In some embodiments, the PSA is based on a (meth) acrylic PSA or at least one poly(meth)acrylate. Herein, (meth)acrylate refers to both acrylate and methacrylate groups. Particularly preferred poly(meth)acrylates are derived from: (A) at least one monoethylenically unsaturated alkyl (meth)acrylate monomer; and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the Tg and cohesive strength of the resultant copolymer. Herein, "copolymer" refers to polymers containing two or more different monomers, including terpolymers, tetrapolymers, etc.

Monomer A, which is a monoethylenically unsaturated alkyl (meth)acrylate, contributes to the flexibility and tack of the copolymer. Preferably, monomer A has a homopolymer Tg of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, polyethoxylated or -propoxylated methoxy (meth)acrylates such as acrylates of CARBOWAX (commercially available from Union Carbide) and NK ester AM90G (commercially available from Shin Nakamura Chemical, Ltd., Japan). Preferred monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the Tg and cohesive strength of the copolymer. Preferably, monomer B has a homopolymer Tg of at least about 10° C. More preferably, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Preferred reinforcing acrylic monomers that can be used as monomer B include acrylic acid and acrylamide. Combinations of various reinforcing monoethylenically unsaturated monomers categorized as a B monomer can be used to make the copolymer.

In some embodiments, the (meth)acrylate copolymer is formulated to have a resultant Tg of less than about 0° C. and more preferably, less than about −10° C. Such (meth)acrylate copolymers preferably include about 60 to about 98% by weight of at least one monomer A and about 2 to about 40% by weight of at least one monomer B, both relative to the total weight of the (meth)acrylate copolymer. Preferably, the (meth)acrylate copolymer has about 85 to about 98% by weight of at least one monomer A and about 2 to about 15% by weight of at least one monomer B, both relative to the total weight of the (meth)acrylate copolymer.

Useful rubber-based PSAs are generally of two classes, natural rubber-based or synthetic rubber-based. Useful natural rubber-based PSAs generally contain masticated natural rubber, for example, from about 20 to about 75% by weight of one or more tackifying resins, from about 25 to about 80% by weight of natural rubber, and typically from about 0.5 to about 2.0% by weight of one or more antioxidants, all relative to the total weight of the masticated rubber. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon.

Antioxidants may be used with natural rubbers in order to retard oxidative attack on the rubber which can result in loss of cohesive strength of the adhesive. Useful antioxidants include but are not limited to amines, such as N—N' di-beta-naphthyl-1,4-phenylenediamine, available as AGERITE Resin D from R.T. Vanderbilt Co., Inc.; phenolics, such as 2,5-di-(t-amyl)hydroquinone, available as SANTOVAR A, available from Monsanto Chemical Co.; tetrakis[methylene 3-(3',5'-di-tert-butyl-4'-hydroxyphenyl)propianate]methane, available as IRGANOX 1010 from Ciba-Geigy Corp.; 2,2'-methylenebis(4-methyl-6-tert butyl phenol), known as Antioxidant 2246; and dithiocarbamates, such as zinc dithiodibutyl carbamate. Curing agents may be used to at least partially vulcanize (crosslink) the PSA.

Useful synthetic rubber-based PSAs include adhesives that are generally rubbery elastomers, which are either self-tacky or non-tacky and require tackifiers. Self-tacky synthetic rubber PSAs include, for example, butyl rubber, a copolymer of isobutylene with less than 3 percent isoprene, polyisobutylene, a homopolymer of isoprene, polybutadiene, or styrene/butadiene rubber. Butyl rubber PSAs often contain an antioxidant such as zinc dibutyl dithiocarbamate. Polyisobutylene PSAs do not usually contain antioxidants. Synthetic rubber PSAs, which generally require tackifiers, are also generally easier to melt process as compared to natural rubber PSAs which typically having very high molecular weights. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich.

Tackifiers that may be used with synthetic rubber PSAs include derivatives of rosins such as FORAL 85, a stabilized rosin ester from Hercules, Inc.; the SNOWTACK series of gum rosins from Tenneco; the AQUATAC series of tall oil rosins from Sylvachem; synthetic hydrocarbon resins such as the PICCOLYTE A series, polyterpenes from Hercules, Inc.; the ESCOREZ 1300 series of C5 aliphatic olefin-derived resins; and the ESCOREZ 2000 Series of C9 aromatic/aliphatic olefin-derived resins. Curing agents may be added to at least partially vulcanize (crosslink) the PSA.

Useful thermoplastic elastomer PSAs include styrene block copolymer PSAs which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer PSAs include linear, radial, star and tapered styrene-isoprene block copolymers such as KRATON D1107P, available from Shell Chemical Co., and EUROPRENE SOL TE 9110, available from EniChem Elastomers Americas, Inc.; linear styrene-(ethylene-butylene) block copolymers such as KRATON G1657, available from Shell Chemical Co.; linear styrene-(ethylene-propylene) block copolymers such as KRATON G1750X, available from Shell Chemical Co.; and linear, radial, and star styrene-butadiene block copolymers such as KRATON D1118X, available from Shell Chemical Co., and EUROPRENE SOL TE 6205, available from EniChem Elastomers Americas, Inc. The polystyrene blocks tend to form domains in the shape of spheroids, cylinders, or plates that causes the block copolymer PSAs to have two phase structures.

Resins that associate with the rubber phase may be used with thermoplastic elastomer PSAs if the elastomer itself is not tacky enough. Examples of rubber phase associating resins include aliphatic olefin-derived resins, such as the ESCOREZ 1300 series and the WINGTACK series, available from Goodyear; rosin esters, such as the FORAL series and the STAYBELITE Ester 10, both available from Hercules, Inc.; hydrogenated hydrocarbons, such as the ESCOREZ 5000 series, available from Exxon; polyterpenes, such as the PICCOLYTE A series; and terpene phenolic resins derived from petroleum or terpentine sources, such as PICCOFYN A100, available from Hercules, Inc.

Resins that associate with the thermoplastic phase may be used with thermoplastic elastomer PSAs if the elastomer is not stiff enough. Thermoplastic phase associating resins include polyaromatics, such as the PICCO 6000 series of aromatic hydrocarbon resins, available from Hercules, Inc.; coumarone-indene resins, such as the CUMAR series, available from Neville; and other high-solubility parameter resins derived from coal tar or petroleum and having softening points above about 85° C., such as the AMOCO 18 series of alphamethyl styrene resins, available from Amoco, PICCOVAR 130 alkyl aromatic polyindene resin, available from Hercules, Inc., and the PICCOTEX series of alphamethyl styrene/vinyl toluene resins, available from Hercules. Useful silicone PSAs may comprise a polymer or gum and an optional tackifying resin. The polymer may be a high molecular weight polydimethylsiloxane or polydimethyldiphenylsiloxane, that contains residual silanol functionality (SiOH) on the ends of the polymer chain; a platinum-catalyzed addition-type silicone polymer derived from silicone materials having vinyl groups that are crosslinked with silicone materials having Si—H groups; or a block copolymer comprising polydiorganosiloxane soft segments and urea terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone PSAs is described in U.S. Pat. No. 2,736,721 (Dexter). Manufacture of silicone urea block copolymer PSAs is described in U.S. Pat. No. 5,214,119 (Leir, et al).

Useful silicone PSAs may also comprise a polydiorganosiloxane polyoxamide and an optional tackifier as described in US 2007/0148475 A1 (Sherman et al.). For example, the polydiorganosiloxane polyoxamide may comprise at least two repeat units of Formula I:

wherein: each R$^1$ is independently an alkyl, haloalkyl, aralkyl, alkenyl, aryl, or aryl substituted with an alkyl, alkoxy, or halo, wherein at least 50 percent of the R$^1$ groups are methyl; each Y is independently an alkylene, aralkylene, or a combination thereof; G is a divalent residue equal to a diamine of formula R$^3$HN-G-NHR$^3$ minus the two —NHR$^3$ groups; R$^3$ is hydrogen or alkyl or R$^3$ taken together with G and with the nitrogen to which they are both attached forms a heterocyclic group; n is independently an integer of 40 to 1500; and p is an integer of 1 to 10; and an asterisk (*) indicates a site of attachment of the repeat unit to another group in the copolymer. The copolymer may have a first repeat unit where p is equal to 1 and a second repeat unit where p is at least 2. G may comprise an alkylene, heteroalkylene, arylene, aralkylene, polydiorganosiloxane, or a combination thereof. The integer n may be an integer of 40 to 500. These polydiorganosiloxane polyoxamides can be used in combination with a tackifier. Useful tackifiers include MQ silicate resins. These Si PSAs may be heat activated.

Prior to embossing, the PSA layer is crosslinked using methods known in the art. In general, crosslinking is used to build molecular weight and strength of the PSA. The degree of crosslinking may be selected based upon the application for which the article is intended. Crosslinking agents may be used to form chemical crosslinks, physical crosslinks or a combination thereof. Chemical crosslinks include covalent bonds and ionic bonds. Covalent crosslinks may be formed by incorporating a multi-functional monomer in the polymerization process, followed by curing using, e.g., ultraviolet radiation, heat, ionizing radiation, moisture, or a combination thereof.

Physical crosslinks include noncovalent bonds and are generally thermally reversible. Examples of physical crosslinks include high Tg (i.e., those having a Tg higher than room temperature, preferably higher than 70° C.) polymer segments included, for example, in thermoplastic elastomer block copolymers. Such segments aggregate to form physical crosslinks that dissipate upon heating. If a physically crosslinked PSA is used such as a thermoplastic elastomer, the embossing typically is carried out at temperature below, or even substantially below, the temperature at which the adhesive flows. Hard segments include the styrene macromers of U.S. Pat. No. 4,554,324 (Husman et al.) and/or acid/base interactions (i.e., those involving functional groups within the same polymer or between polymers or between a polymer and an additive) such as polymeric ionic crosslinking as described in WO 99/42536.

Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e.g., radiation having a wavelength of about 250 nanometers to about 400 nanometers), causes the copolymer to crosslink. The crosslinking agent is used in an effective amount, by which is meant an amount that is sufficient to cause crosslinking of the PSA to provide adequate cohesive strength to produce the desired final adhesion properties. Preferably, the crosslinking agent is used in an amount of about 0.1 part to about 10 parts by weight, based on the total weight of monomers.

The crosslinked pressure sensitive adhesive can optionally include one or more additives such as initiators, filler, plasticizers, tackifiers, chain transfer agents, fibrous reinforcing agents, woven and non-woven fabrics, foaming agents, antioxidants, stabilizers, fire retardants, viscosity modifying agents, coloring agents, and mixtures thereof.

The thickness of the crosslinked PSA layer is selected based upon the application for which the adhesive article is intended. In general, the thickness of the crosslinked PSA layer ranges from about 10 micrometers (about 0.4 mils) to about 1500 micrometers (about 60 mils).

One class of useful crosslinked PSAs includes adhesives having properties that make them suitable for optical applications. Examples of optical applications include windows, vehicle windshields, displays, and the like. Useful adhesives can be selected such that upon dry lamination to a substrate, the microstructured crosslinked pressure sensitive adhesive layer of the laminate has a haze value, measured according to ASTM D 1003, of less than about 50% (e.g., less than about 10%, preferably less than about 3%, and more preferably less than about 1%) of the haze value of the layer of the cut adhesive article. Such adhesives also preferably do not interfere with light transmission over the wavelength region of interest (e.g., the visible region). For example, the microstructured crosslinked pressure sensitive adhesive layer of the laminate can have a haze value, measured according to ASTM D 1003, of less than about 25% (e.g., less than about 5% or even less than about 2%) of the haze value of the layer of the cut adhesive article; and wherein the microstructured crosslinked pressure sensitive adhesive layer of the laminate can have a luminous transmittance value, measured according to ASTM D 1003, of at least about 85% (e.g., at least about 95%). In addition, the microstructured crosslinked pressure sensitive adhesive layer of the laminate can have an opacity value of less than about 3% (e.g., less than about 1% or less than about 0.5%), as measured by a spectrophotometer using well-known analysis techniques.

The crosslinked PSA layer is disposed on a substrate. The substrate may be removable from the crosslinked PSA layer, i.e., it may be a release liner. The substrate may be non-removable such as a polymeric film or a rigid or non-rigid substrate. The substrate may be polymeric or of some natural material such as polylactic acid, cotton, or paper. The substrate may comprise a label, a vapor metal-coated graphic film for radiation rejection applications, or an optical film used to manage light in some particular way. An example of an optical film is a multilayer optical film such as a polarizer or a mirror.

Figure 1:
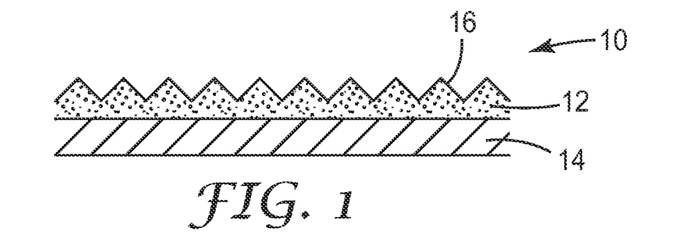
FIGS. 1 and 2 are cross-sectional schematic diagrams of exemplary adhesive articles.

FIG. 1 shows a schematic diagram of exemplary adhesive article 10 either before or it is die cut. An outer surface of a crosslinked PSA layer on substrate 14 is embossed to form microstructured crosslinked PSA layer 12 having a microstructured adhesive surface 16. Embossing may be accomplished by contacting the surface of the crosslinked PSA layer with a microstructured molding tool. The microstructured molding tool is an implement for imparting a microstructure to a surface of a PSA layer and which may be continuously reused in the process. In general, the microstructured molding tool is capable of separating cleanly from the PSA layer. The tool can be in form of a planar stamping press, flexible or inflexible belts, or a roller. The topography of the tool used to create the embossed microstructures can be prepared using techniques such as chemical etching, mechanical etching, laser ablation, photolithography, stereolithography, micromachining, knurling, cutting, scoring, and the like. The microstructured molding tool may also be prepared by replicating various microstructured surfaces, including irregular shapes and patterns, with a moldable material such crosslinkable liquid silicone rubber, radiation curable urethanes, etc. or by electroforming.

The microstructured molding tool may also be prepared by imaging a film comprising a two-phase copolymer network, for example, as described in commonly assigned U.S. Ser. No. 11/930,800 (Mazurek et al.). In this case, the film can be heat patterned to permanently set or image the film after it has been formed. Alternatively, if the film is formed by curing, it can be cured in an imagewise manner by exposure through a mask such that a surface topology is imparted to the film due to the preferential regional shrinkage of the curing medium.

Figure 2:
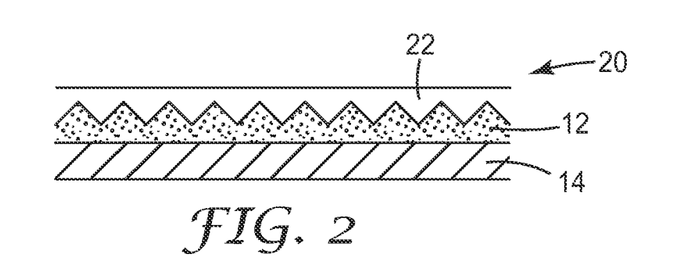

Embossing may also be accomplished by contacting a surface of the crosslinked PSA layer with a microstructured release liner. FIG. 2 shows a schematic diagram of exemplary adhesive article 20 either before or it is die cut. An outer surface of a crosslinked PSA layer on substrate 14 is embossed to form microstructured crosslinked PSA layer 12 having a microstructured adhesive surface adjacent microstructured release liner 22. Suitable microstructured release liners are capable of being placed in intimate contact with the crosslinked PSA layer and subsequently removed without damaging the layer. Examples of microstructured release liners include polyethylene, polypropylene, polyester, cellulose acetate, polyvinylchloride, and polyvinylidene films, as well as paper. The microstructured surface of the microstructured release liner may have a coating of a release agent on it, for example, silicone or polyethylene. The microstructured release liner may be prepared by embossing a flat release liner with the desired microstructure. Commercially available examples of microstructured and flat release liners include those available from 3M Company (St. Paul, Minn.), Rexam Corp. (Iowa City, Iowa), Daubert Coated Products (Westchester, Ill.), P.S. Substrates, Inc., Schoeller Technical Papers, Inc., Mondi Inncoat GMBH, and P.W.A. Kunstoff GMBH.

The microstructures that are embossed into the surface of the crosslinked PSA layer are generally three-dimensional structures that are microscopic in at least two dimensions (i.e., the topical and/or cross-sectional view is microscopic). The term "microscopic" as used herein refers to dimensions that are difficult to resolve by the human eye without aid of a microscope.

The microstructures may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In some cases, it may be desirable to include topographical features that promote air egress at the bonding interface when the article is laminated to a substrate. In this regard, V-grooves and channels that can extend to the edge of the article are particularly useful. The particular dimensions and patterns characterizing the microstructures are selected based upon the specific application for which the article is intended. Another example of useful microstructures are described in US 2007/0292650 A1 (Suzuki) wherein the microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

A cut adhesive article is then prepared by die cutting the microstructured crosslinked PSA layer. Die cutting can comprise rotary die cutting or flat bed die cutting. Rotary die cutting involves cutting materials between blades on a cylindrical die and an anvil which is a smooth hard cylinder. The material to be die cut can be supplied in the form of sheets or rolls. Rotary depth-controlled die cutting and kiss cutting may be useful in cases where not all layers are to be cut. In rotary depth-controlled die cutting, a rotary die is used in conjunction with an anvil roll and the cutting (or crushing) edge of the die penetrates through the desired layer(s) during operation. Thru cutting may be useful in cases where all layers are to be cut. In general, sharper blades perform better than duller blades. The angles of useful blades, relative to the article to be cut, are variable, but typically close to perpendicular (2-10 degree angles on the blade). It is possible to make a bad cut by deforming the material going through the die. Rotary die cutting may be used in conjunction with coating, laminating, and/or embossing operations.

In some embodiments, only the microstructured crosslinked PSA layer is die cut. In other embodiments, the substrate and the microstructured crosslinked PSA layer may be die cut. The adhesive article can be die cut with the substrate facing up or down relative to the side of entry by the cutting blade.

The adhesive article having a microstructured crosslinked PSA layer disposed on a substrate may also comprise a microstructured release liner such that the PSA layer is disposed between the liner and the substrate. For example, if embossing comprises contacting the surface of the crosslinked PSA layer with a microstructured release liner, the liner may be kept in contact with the crosslinked PSA layer and removed sometime after the die cutting operation. In this case, die cutting may comprise die cutting the microstructured release liner, the microstructured crosslinked PSA layer, and optionally the substrate.

For embodiments in which embossing comprises contacting the crosslinked PSA layer with a microstructured molding tool, cutting may be carried out before or after the crosslinked PSA layer is microstructured. For example, it may be desirable to cut the microstructured adhesive layer before the layer is released from the tool. In some embodiments, it may be desirable to contact the microstructured adhesive layer with the substrate shortly after the layer is released from the tool.

Figure 3:
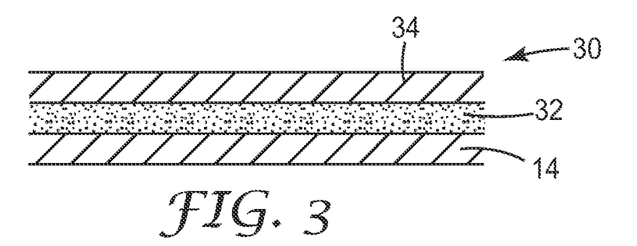
FIG. 3 is a cross-sectional schematic diagram of an exemplary laminate.

Also described herein is a method of forming a laminate, comprising: providing the cut adhesive article described above, and contacting the microstructured adhesive surface to a second substrate. At some time during and/or after lamination, the microstructural features flatten out to wet the second substrate surface, thereby forming a permanent or removable bond to the second substrate surface. FIG. 3 is a schematic diagram of exemplary laminate 30 having crosslinked PSA layer 32 disposed between substrate 14 and second substrate 34. The adhesive surface adjacent the second substrate was a microstructured adhesive surface, and the microstructures have flattened out to give crosslinked PSA layer 32. In the course of lamination, air bleeds out through the microstructural features to minimize or prevent the formation of bonding defects. The air bleed feature is particularly important when dealing with lamination to rigid substrates, especially rigid-to-rigid lamination or where the object to be laminated is relatively large. Currently used methods to prevent defects in such laminations include techniques such as coating the adhesive layer with water or a water-detergent solution to prevent bubble formation during lamination. These techniques require removal of the water by evaporation. Bubble formation is particularly unacceptable in optical applications.

The second substrate may be rigid in that it is not easily bendable under normal use or during manufacture, or the substrate may be flexible in that it is at least somewhat bendable under normal use or during manufacture. Examples of suitable second substrates include glass, metal, plastic, wood, and ceramic substrates, painted surfaces of these substrates, surfaces of optical devices such as display substrates, and the like. Representative plastic substrates include polyester, polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers. The second substrate may also be a woven fabric formed form threads of synthetic or natural materials such as, for example, cotton, nylon, rayon, glass, or ceramic material. The second substrate may also be made of a nonwoven fabric such as air laid webs of natural or synthetic fibers or blends thereof. The second substrate may also comprise an optical device such as a hand-held electronic device, a television, a computer monitor, or a digital sign.

For optical applications, useful second substrates include those that are substantially specular such as glass, clear polymeric materials, and the like. The adhesive forms a substantially specular adhesive layer when permanently bonded to such a second substrate. The term "substantially specular" as used herein refers to a material that absorbs substantially no light over a wavelength region of interest, i.e., substantially all light over the wavelength region of interest that falls on the surface of the substantially specular material is reflected or transmitted.

For embodiments in which the substrate is removable from the microstructured adhesive layer, a method of forming a laminate may comprise: providing the cut adhesive article described above, the substrate comprising a release liner; contacting the microstructured adhesive surface with a second substrate; removing the release liner to expose a surface of the cut adhesive article; and contacting the adhesive surface to a third substrate. The substrates, including the second and third substrates, may be used in any combination of the substrates described above. For example, the second substrate may comprise a rigid substrate. For another example, the second and third substrates may comprise rigid substrates. In some embodiments, the removable substrate may comprise a microstructured release liner such that the adhesive surface is microstructured when contacted to the second substrate. This method may be useful for forming double-pane windows.

Also disclosed herein is a method of forming a cut adhesive article, comprising: providing an adhesive article comprising a crosslinked pressure sensitive adhesive layer disposed between two release liners; removing one of the two release liners to expose a surface of the crosslinked pressure sensitive adhesive layer; embossing the surface of the crosslinked pressure sensitive adhesive layer to form a microstructured crosslinked pressure sensitive adhesive layer having a microstructured surface, wherein embossing comprises contacting the surface of the crosslinked pressure sensitive adhesive layer with a microstructured release liner; and die cutting the microstructured crosslinked pressure sensitive adhesive layer.

Also disclosed herein is a method of forming a cut adhesive article, comprising: providing an adhesive article comprising a crosslinked pressure sensitive adhesive layer disposed on a release liner; contacting the crosslinked pressure sensitive adhesive layer with a substrate; removing the release liner to expose a surface of the crosslinked pressure sensitive adhesive layer; embossing the surface of the crosslinked pressure sensitive adhesive layer to form a microstructured crosslinked pressure sensitive adhesive layer having a microstructured surface, wherein embossing comprises contacting the surface of the crosslinked pressure sensitive adhesive layer with a microstructured release liner; and die cutting the microstructured crosslinked pressure sensitive adhesive layer.

The cut adhesive article may be provided in a variety of forms, for example, as one or more sheets that may be stacked, or as a roll. In the latter case, a method of making a roll of cut adhesive articles may comprise: providing an adhesive article having a crosslinked pressure sensitive adhesive layer disposed on a substrate, embossing a surface of the crosslinked pressure sensitive adhesive layer to form a microstructured crosslinked pressure sensitive adhesive layer having a microstructured adhesive surface, die cutting the microstructured crosslinked pressure sensitive adhesive layer to form a plurality of cut adhesive articles, and forming the plurality of cut adhesive articles into a roll. The method may further comprise unwinding the roll and removing at least one cut adhesive article from the substrate. In some embodiments, embossing comprises contacting the surface of the crosslinked pressure sensitive adhesive layer with a microstructured release liner. The cut adhesive article that is rolled up may include the microstructured release liner.

Figure 4A:
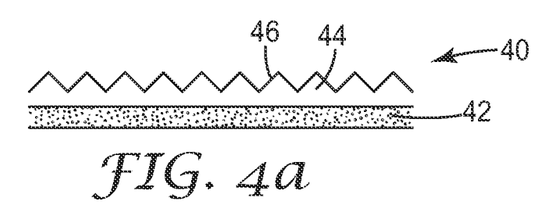
FIG. 4a is a cross-sectional schematic diagram of an exemplary adhesive article.
Figure 4B:
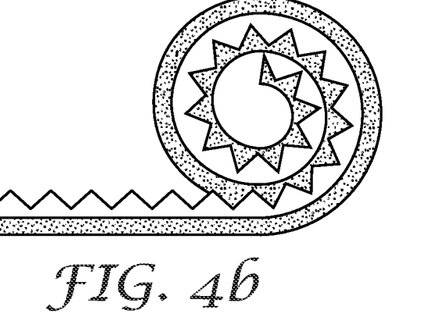
FIG. 4b is a cross-sectional schematic diagram of an exemplary adhesive article in roll form.

Also disclosed herein is a cut adhesive article comprising: a crosslinked PSA layer and a microstructured release liner having a substantially flat surface and an opposing microstructured surface, wherein the crosslinked PSA layer is disposed on the substantially flat surface. FIG. 4a shows exemplary adhesive article 40 either before or after it is cut. Crosslinked PSA layer 42 is disposed on microstructured release liner 44 on the side opposite microstructured surface 46. Cut adhesive articles having this construction may be useful in cases where the article is provided in roll form. FIG. 4b is a cross-sectional schematic diagram of exemplary adhesive article 40 in roll form. The microstructured surface contacts the crosslinked PSA layer such that a microstructured adhesive surface is formed.

Also disclosed herein is a method of dispensing an adhesive article, comprising: providing a microstructured adhesive article prepared by: providing a crosslinked pressure sensitive adhesive layer disposed on a substrate, and embossing a surface of the crosslinked pressure sensitive adhesive layer to form a microstructured crosslinked pressure sensitive adhesive layer having a microstructured adhesive surface, wherein embossing comprises contacting a surface of the crosslinked pressure sensitive adhesive layer with a microstructured release liner; and bending the microstructured adhesive article such that the microstructured crosslinked pressure sensitive adhesive layer self-releases from the microstructured liner.

EXAMPLES

Example 1

A liner/PSA/liner construction was prepared and consisted of an optical PSA layer (2 mil thickness) between two silicone-coated PET flat release liners (2 mil thickness each). The PSA consisted of 3M Optical Adhesive 8142, a crosslinked acrylate PSA, 50 microns thick, available from 3M Co. One release liner was removed and the PSA layer laminated to PET backing (2 mil thickness) using a hand roller. The other release liner was removed and a microstructured liner was laminated to the adhesive layer using a rubber-rubber laminator (GBC Catena 35) under 50 psi. The microstructured liner was a paper liner having contiguous square pyramids formed by intersecting ridges in the adhesive surface; pyramid dimensions were 200 um base with 8 degree sidewall angles.

The backing/PSA/microstructured liner construction was then die cut 3-4 times with a rotary die cutter. The microstructured liner was positioned farthest from the blade. Results are described in Table 1.

Examples 2-6

Examples 2-6 were prepared as described for Example 1 except that different microstructured liners as described in Table 1 were used.

Comparative Example 1 (C1)

C1 was prepared as described for Example 1 except that the second silicone-coated PET flat release liner was not replaced with a microstructured liner.

Comparative Example 2 (C2)

C2 was prepared as described for Example 1 except that the microstructured liner was replaced with a flat paper liner.

TABLE 1

| Ex. | Liner | Result |
|---|---|---|
| 1 | Paper liner having square pyramidal microstructures (200 um pitch, 13 um depth) | Samples slide easily on each other, can be shuffled like a deck of cards, no sticky edges seen. |
| 2 | Paper liner having square pyramidal microstructures (292 um pitch, 25 um depth) | Samples slide easily on each other, can be shuffled like a deck of cards, no sticky edges seen. |
| 3 | Paper liner having truncated square pyramidal microstructures (292 um pitch, 13 um depth, 10° angle) | Samples slide easily on each other, can be shuffled like a deck of cards, no sticky edges seen. |
| 4 | PET liner having square pyramidal microstructures (292 um pitch, 13 um depth, 10° angle) | Some very slight sticking. |
| 5 | PET liner having square pyramidal microstructures (200 um pitch, 13 um depth) | Most samples slide easily on each other, can be shuffled like a deck of cards. |
| 6 | PET liner having square pyramidal microstructures (292 um pitch, 25 um depth) | Most samples slide easily on each other, can be shuffled like a deck of cards, only 1 sticky edge seen. |
| C1 | Flat PET liner | Sticky edges, samples stick to each other with gentle contact |
| C2 | Flat paper liner | Most samples slide easily on each other, can be shuffled like a deck of cards. |

Liners

Liner A consisted of 58 pound polycoated Kraft liner paper available from Jen-coat Inc. that was coated on both sides with a solventless silicone release material at about 1.3 g/m².

Liner B consisted of 94 pound white polycoated Kraft liner paper coated on both sides with polyethylene and available from Loparex. A solvent-based silicone release material was coated at 0.4-0.5 g/m² on each side.

Preparation of Microstructured Liners

Liners A and B were embossed to give Microstructured Liners A and B, respectively. A Wabash platen press was preheated to a temperature of 100° C. for embossing low density polyethylene (LDPE) side, and 110° C. if embossing high density polyethylene (HDPE) coated paper side. The following stack was created with the liner to be embossed and the tool used for embossing: 14"×14" cardboard piece/12"×12" chrome plated polished steel plate/2.0 mil PET silicone release liner/DSS nickel plated tool (face up)/liner to be embossed (face down)/2.0 mil PET silicone release liner/12"×12" chrome plated polished steel plate/14"×14" cardboard piece. This stack was placed between the top and bottom platens. The platens were brought together, and the stack was pre-pressed for 3 minutes at 5000 psi, followed by high pressure at 15 tons for LDPE coated paper substrates and 40 tons for HDPE coated paper substrates for another 3 minutes. The stacks were then cooled at least 20 degrees below press temperature while under the high pressure, and then removed from the press. The microstructured surface that was embossed into the liner comprised square pyramidal microstructures each having 292 um pitch and 15 um depth.

Evaluation

Examples 7-10 and Comparative Examples 3-6 (C3-C6) were examined using scanning electron microscopy (SEM). Each cut was rated on a scale of 1-5, 5 being the best. Ratings were assigned based on the view at the cut edge and the extent of adhesive ooze and edge stickiness. A rating of '5' indicates a clear pull back from the cut line while '1' indicates significant adhesive extending over the cut-line. Results are shown in Table 2.

Examples 7-10 and Comparative Examples 3-6 (C3-C6) were subjected to peel testing (180 degree) in order to study the characteristics of the resulting laminate. A 1 mil PET was laminated to the adhesives and the resultant 'tape' was then dry laminated to different liners as described below. Peel testing was conducted on IMASS tester at 90 inches per minute. Samples were peeled right away after 4.5 lb rolldown and after aging for 7 days under constant temperature conditions (22° C., 50% relative humidity). The average of 2-3 measurements is provided in Table 2.

Example 7

Example 7 was prepared using an adhesive article consisting of Crosslinked PSA Layer A disposed on Liner A. Crosslinked PSA Layer A (3.5 mil) was prepared from monomers isooctyl acrylate/isobornyl acrylate/acrylic acid at a ratio of 83/16/1 by weight with less than 0.2 wt. % 2,4-bis (trichloromethyl)-6-(4-methoxy)-s-triazine as crosslinker. Crosslinked PSA Layer A also comprised 24 parts of tackifier REGALREZ 6108 per 100 parts of total monomers.

The faceside of the adhesive layer was dry laminated to a PET backing (1.5 mil). Liner A was then removed and replaced with Microstructured Liner A by passing the resulting laminate through a nip of a 2 roll laminator. The resulting laminate was then converted using rotary controlled depth die-cutting to cut through the PET backing and microstructured crosslinked adhesive layer but not the Microstructured Liner A. A Mark Andy Mode 830 press operating at about 30 ft/sec was used. The press was equipped with a die having 3 labels across, 1.25 inches" label width, and 2.25 inches" label length. After each die-cutting operation, the matrix surrounding the label was peeled away to leave rows of labels adhered to Microstructured Liner A.

Example 8

Example 8 was prepared as described for Example 7 except that Microstructured Liner B was used instead of Microstructured Liner A.

Example 9

Example 9 was prepared as described for Example 7 except that Crosslinked PSA Layer B was used in place of Crosslinked PSA Layer A. Crosslinked PSA Layer B consisted of an optical crosslinked PSA layer disposed between two silicone-coated PET flat release liners (2 mil thickness each). Crosslinked PSA Layer B consisted of 3M Optical Adhesive 8142, a crosslinked acrylate PSA, 50 microns thick, available from 3M Co.

Example 10

Example 10 was prepared as described for Example 8 except that Crosslinked PSA Layer B was used instead of Crosslinked Layer A.

Comparative Example 3 (C3)

Comparative Example 3 was prepared as described for Example 7 except that Liner A was not replaced with Microstructured Liner A.

Comparative Example 4 (C4)

Comparative Example 4 was prepared as described for Example 7 except that Liner B was used instead of Liner A.

Comparative Example 5 (C5)

Comparative Example 5 was prepared as described for Comparative Example 3 except that Crosslinked PSA Layer B was used instead of Crosslinked PSA Layer A.

Comparative Example 6 (C6)

Comparative Example 6 was prepared as described for Comparative Example 4 except that Crosslinked PSA Layer B was used instead of Crosslinked PSA Layer A.

TABLE 2

| Ex. | Crosslinked PSA Layer | Liner | Cut Rating | Avg. Initial Peel (g/in) | Avg. Peel After 7 days (g/in) | Avg. Peel After 7 days at 70° C. (g/in) |
| --- | --- | --- | --- | --- | --- | --- |
| 7 | A | Microstructured Liner A | 4.5 | 7.1 | 21.7 | 20.7 |
| 8 | A | Microstructured Liner B | 4.0 | 15.1 | 32.8 | 37.9 |
| 9 | B | Microstructured Liner A | NM | 5.1 | NM | NM |
| 10 | B | Microstructured Liner B | NM | 6.3 | NM | NM |
| C3 | A | Liner A | 1.0 | 8.0 | 12.7 | 19.2 |
| C4 | A | Liner B | 3.0 | 19.2 | 25.8 | 37.1 |
| C5 | B | Liner A | NM | 6.7 | NM | NM |
| C6 | B | Liner B | NM | 12.6 | NM | NM |

NM = not measured

Example 11

Figure 5:
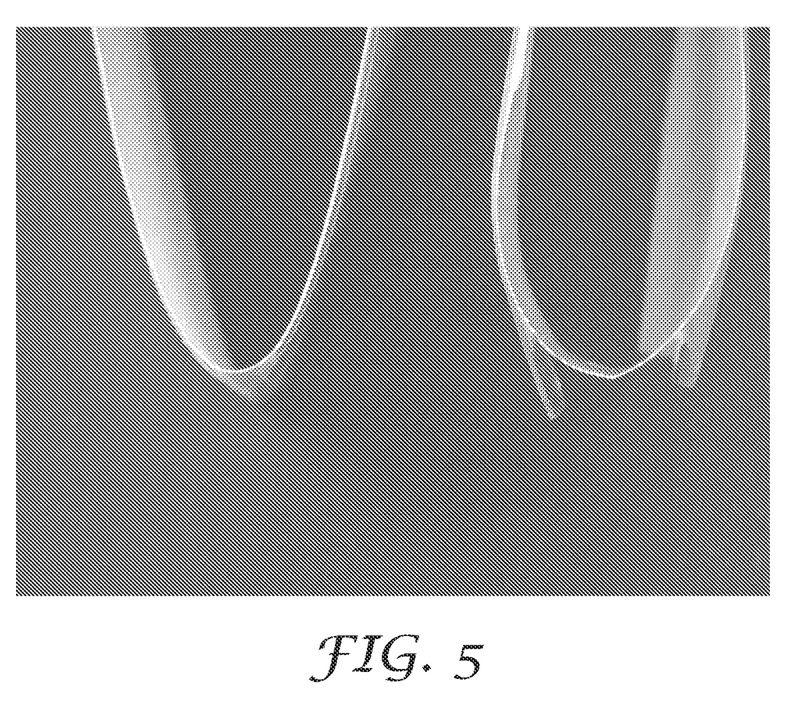
FIG. 5 is a photograph comparing self-releasability of an exemplary adhesive article and a known adhesive article.

A 1.5 mil PET backing was laminated to the exposed adhesive layer of a 20 mil clear acrylic transfer tape on a red polyethylene liner. The red liner was removed and Microstructured Liner B was laminated to the exposed adhesive layer by passing the resulting laminate through a nip of a 2 roll laminator. The resulting laminate was then converted using rotary controlled depth die-cutting as described above to cut through the PET backing and microstructured crosslinked adhesive layer. After the die-cutting operation, the matrix surrounding the label was peeled away to leave rows of labels adhered to the microstructured liner. The microstructured liner was bent as shown in FIG. 5 (right hand side) and the PSA peeled away from the liner.

Comparative Example 7 (C7)

Comparative Example 7 was prepared as described for Example 11 except that Liner B was used instead of Microstructured Liner B. The microstructured liner was bent as shown in FIG. 5 (left hand side) and the PSA did not peel away from the liner.

A number of embodiments of the invention have been described. Nevertheless, it will be understood that various modifications may be made without departing from the spirit and scope of the invention. Accordingly, other embodiments are within the scope of the following claims.

What is claimed is:

1. A method of dispensing an adhesive article, comprising:
providing a microstructured adhesive article prepared by:
   providing a chemically crosslinked pressure sensitive adhesive layer disposed on a substrate where the chemically crosslinked pressure sensitive adhesive is a crosslinked poly(meth)acrylate pressure sensitive adhesive, and
   embossing a surface of the chemically crosslinked pressure sensitive adhesive layer to form a microstructured chemically crosslinked pressure sensitive adhesive layer having a microstructured adhesive surface, wherein embossing comprises contacting a surface of the chemically crosslinked pressure sensitive adhesive layer with a microstructured release liner, wherein the microstructured release liner comprises a polyethylene-coated paper liner with a solvent delivered silicone release coating, and wherein the microstructured release liner comprises a microstructured pattern having features with depths of from 13-25 micrometers; and
bending the microstructured adhesive article such that the microstructured chemically crosslinked pressure sensitive adhesive layer self-releases from the microstructured liner.

2. A method of making a cut adhesive article, comprising:
providing an adhesive article having a chemically crosslinked pressure sensitive adhesive layer disposed on a substrate where the chemically crosslinked pressure sensitive adhesive is a crosslinked poly(meth)acrylate pressure sensitive adhesive,
embossing a surface of the chemically crosslinked pressure sensitive adhesive layer with a microstructured release liner, wherein the microstructured release liner comprises a silicone-coated polyethylene terephthalate liner or a high density polyethylene-coated paper liner with a solventless silicone release coating, and wherein the liner comprises a microstructured pattern having features with depths of from 13-25 micrometers to form a microstructured chemically crosslinked pressure sensitive adhesive layer having a microstructured adhesive surface, and
die cutting the microstructured chemically crosslinked pressure sensitive adhesive layer, wherein the die cut edge of the microstructured chemically crosslinked pressure sensitive adhesive layer shows decreased adhesive ooze and edge stickiness when compared to the same chemically crosslinked pressure sensitive adhesive layer that does not have a microstructured surface.

3. The method of claim 1, wherein embossing comprises contacting the surface of the chemically crosslinked pressure sensitive adhesive layer with a microstructured release liner.

4. The method of claim 3, wherein die cutting further comprises die cutting the microstructured release liner.

5. The method of claim 1, wherein embossing comprises contacting the surface of the chemically crosslinked pressure sensitive adhesive layer with a microstructured molding tool.

6. The method of claim 1, wherein die cutting comprises rotary die cutting.

7. The method of claim 1, wherein die cutting further comprises die cutting the substrate.

8. A method of forming a laminate, comprising:
providing an adhesive article having a chemically crosslinked pressure sensitive adhesive layer disposed on a substrate where the chemically crosslinked pressure sensitive adhesive is a crosslinked poly(meth)acrylate pressure sensitive adhesive,
embossing a surface of the chemically crosslinked pressure sensitive adhesive layer with a microstructured release liner, wherein the microstructured release liner comprises a silicone-coated polyethylene terephthalate liner or a high density polyethylene-coated paper liner with a solventless silicone release coating and wherein the liner comprises a microstructured pattern having features with depths of from 13-25 micrometers, to form a microstructured chemically crosslinked pressure sensitive adhesive layer having a microstructured adhesive surface, and
die cutting the microstructured chemically crosslinked pressure sensitive adhesive layer, wherein the die cut edge of the microstructured chemically crosslinked pressure sensitive adhesive layer shows decreased adhesive ooze and edge stickiness when compared to the same chemically crosslinked pressure sensitive adhesive layer that does not have a microstructured surface,
exposing the microstructured adhesive surface by removing the microstructured release liner, and
contacting the microstructured adhesive surface to a second substrate.

9. A method of forming a laminate, comprising:
providing an adhesive article having a chemically crosslinked pressure sensitive adhesive layer disposed on a substrate where the chemically crosslinked pressure sensitive adhesive is a crosslinked poly(meth)acrylate pressure sensitive adhesive,
embossing a surface of the chemically crosslinked pressure sensitive adhesive layer with a microstructured release liner, wherein the microstructured release liner comprises a silicone-coated polyethylene terephthalate liner or a high density polyethylene-coated paper liner with a solventless silicone release coating, and wherein the liner comprises a microstructured pattern having features with depths of from 13-25 micrometers, to form a microstructured chemically crosslinked pressure sensitive adhesive layer having a microstructured adhesive surface, and
die cutting the microstructured chemically crosslinked pressure sensitive adhesive layer, wherein the die cut edge of the microstructured chemically crosslinked pressure sensitive adhesive layer shows decreased adhesive ooze and edge stickiness when compared to the same chemically crosslinked pressure sensitive adhesive layer that does not have a microstructured surface,
exposing the microstructured adhesive surface by removing the microstructured release liner, the substrate comprising a release liner;
contacting the microstructured adhesive surface with a second substrate;
removing the release liner to expose a surface of the cut adhesive article; and
contacting the surface to a third substrate.

10. A method of forming a cut adhesive article, comprising:
providing an adhesive article comprising a chemically crosslinked pressure sensitive adhesive layer disposed between two release liners where the chemically crosslinked pressure sensitive adhesive is a crosslinked poly(meth)acrylate pressure sensitive adhesive;
removing one of the two release liners to expose a surface of the chemically crosslinked pressure sensitive adhesive layer;
embossing the surface of the chemically crosslinked pressure sensitive adhesive layer to form a microstructured chemically crosslinked pressure sensitive adhesive layer having a microstructured surface, wherein embossing comprises contacting the surface of the chemically crosslinked pressure sensitive adhesive layer with a microstructured release liner, wherein the microstructured liner comprises a silicone-coated polyethylene terephthalate liner or a high density polyethylene-coated paper liner with a solventless silicone release coating, and wherein the microstructured release liner comprises a microstructured pattern having features with depths of from 13-25 micrometers; and
die cutting the microstructured chemically crosslinked pressure sensitive adhesive layer, wherein the die cut edge of the microstructured chemically crosslinked pressure sensitive adhesive layer shows decreased adhesive ooze and edge stickiness when compared to the same chemically crosslinked pressure sensitive adhesive layer that does not have a microstructured surface.

11. A method of forming a cut adhesive article, comprising:
providing an adhesive article comprising a chemically crosslinked pressure sensitive adhesive layer disposed on a release liner substrate where the chemically crosslinked pressure sensitive adhesive is a crosslinked poly(meth)acrylate pressure sensitive adhesive;
contacting the chemically crosslinked pressure sensitive adhesive layer with a substrate;
removing the release liner to expose a surface of the chemically crosslinked pressure sensitive adhesive layer;
embossing the surface of the chemically crosslinked pressure sensitive adhesive layer to form a microstructured chemically crosslinked pressure sensitive adhesive layer having a microstructured surface, wherein embossing comprises contacting the surface of the chemically crosslinked pressure sensitive adhesive layer with a microstructured release liner, wherein the microstructured release liner comprises a silicone-coated polyethylene terephthalate liner or a high density polyethylene-coated paper liner with a solventless silicone release coating, and wherein the microstructured release liner comprises a microstructured pattern having features with depths of from 13-25 micrometers; and
die cutting the microstructured chemically crosslinked pressure sensitive adhesive layer, wherein the die cut edge of the microstructured chemically crosslinked pressure sensitive adhesive layer shows decreased adhesive ooze and edge stickiness when compared to the same chemically crosslinked pressure sensitive adhesive layer that does not have a microstructured surface.

12. A method of making a roll of cut adhesive articles, comprising:
providing an adhesive article having a chemically crosslinked pressure sensitive adhesive layer disposed on a substrate where the chemically crosslinked pressure sensitive adhesive is a crosslinked poly(meth)acrylate pressure sensitive adhesive;
embossing a surface of the chemically crosslinked pressure sensitive adhesive layer to form a microstructured chemically crosslinked pressure sensitive adhesive layer having a microstructured adhesive surface, wherein embossing comprises contacting the surface of the chemically crosslinked pressure sensitive adhesive layer with a microstructured release liner, wherein the microstructured release liner comprises a silicone-coated polyethylene terephthalate liner or a high density polyethylene-coated paper liner with a solventless silicone release coating, and where the microstructured release liner comprises a microstructured pattern having features with depths of from 13-25 micrometers;
die cutting the microstructured chemically crosslinked pressure sensitive adhesive layer to form a plurality of cut adhesive articles, wherein the die cut edge of the microstructured chemically crosslinked pressure sensitive adhesive layer shows decreased adhesive ooze and edge stickiness when compared to the same chemically crosslinked pressure sensitive adhesive layer that does not have a microstructured surface; and
forming the plurality of cut adhesive articles into a roll.

* * * * *